UNITED STATES PATENT OFFICE.

DANIEL DRAWBAUGH, OF EBERLY'S MILL, PENNSYLVANIA.

SUBSTANCE FOR TELEPHONE-ELECTRODES.

SPECIFICATION forming part of Letters Patent No. 567,966, dated September 22, 1896.

Application filed January 10, 1896. Serial No. 575,015. (No specimens.)

*To all whom it may concern:*

Be it known that I, DANIEL DRAWBAUGH, a citizen of the United States, residing at Eberly's Mill, in the county of Cumberland and State of Pennsylvania, have invented certain new and useful Improvements in Substances for Telephone-Electrodes; and I do hereby declare the following to be a full, clear, and exact description of the invention, such as will enable others skilled in the art to which it appertains to make and use the same.

This invention relates to substances for telephone-electrodes.

The object of the invention is to present a ready and efficient substitute for the granular carbon now employed in many telephones.

Heretofore platinum has been suggested and tried as an electrode, either in pellets of the compact metal or in the form of spongy platinum; but the same has been found to be of too high conductivity for efficient use.

My invention consists in the employment of platinum, but in a form in which its conductivity will have been suitably lowered by the treatment hereinafter described.

To carry my invention into effect, I take compact or spongy platinum in a suitably fine state of division and treat this with a solution of nitrate or chlorid of silver and subject the product to the action of light.

To effect the desired result with nitrate of silver, I make a solution of nitrate of silver of the strength, say, of one dram of nitrate to an ounce of water, and into this, as a bath, place the comminuted platinum. I leave the platinum in this bath for, say, ten minutes, somewhat more or less, and thereafter lift it from the bath and place it upon bibulous paper to take up most of the moisture. After this I subject it to a suitable heat to dry it thoroughly, without overheating, and thereafter subject it to the action of sunlight, say for an hour or more, resulting in the formation of a reduced silver salt on the surface of the platinum.

To effect the desired result with chlorid of silver, the procedure is substantially the same, the effect of the light, however, being to turn the platinum darker. A suitable solution of chlorid of silver may readily be prepared from the bath of nitrate of silver above set forth by adding a solution of chlorid of sodium or sal-ammoniac in excess to the bath, whereby the silver chlorid formed at first is dissolved. The subsequent subjection of the comminuted platinum to the bath, its drying, and its subjection to light will then be about the same.

I have found by experience that platinum, when subjected to the treatment above described, forms a very perfect granular substance for the electrodes of telephones, giving great distinctness and clearness of transmission of articulate speech without slur or break, and requiring less bulk than that of carbon for use, and never packing.

Having thus fully described my invention, what I claim as new, and desire to secure by Letters Patent, is—

1. The method of preparing substances for use at telephone-electrodes, which consists in taking a body of granular or finely-divided platinum, treating this with a solution of nitrate or chlorid of silver, then partially drying the same, then subjecting it to the action of heat until thoroughly dried, and, finally, subjecting it to the action of sunlight, substantially as described.

2. A substance for use at telephone-electrodes, consisting of granular platinum having its surface covered with a reduced silver salt, substantially as described.

In testimony whereof I affix my signature in presence of two witnesses.

DANIEL DRAWBAUGH.

Witnesses:
R. G. DYRENFORTH,
E. H. PARRY.